(12) United States Patent
Kobres et al.

(10) Patent No.: US 12,033,127 B2
(45) Date of Patent: Jul. 9, 2024

(54) METHODS AND SYSTEM FOR PASSIVE AUTHENTICATION THROUGH USER ATTRIBUTES

(71) Applicant: NCR Voyix Corporation, Atlanta, GA (US)

(72) Inventors: Erick Kobres, Lawrenceville, GA (US); Stavros Antonakakis, Lake Mary, FL (US); Ajay Gordhandas Mulani, Mumbai (IN); Ravi Prakash Mishra, Telangana (IN); Suman Kumar Bhowmick, Telengana (IN)

(73) Assignee: NCR Voyix Corporation, Atlanta, GA (US)

( * ) Notice: Subject to any disclaimer, the term of this patent is extended or adjusted under 35 U.S.C. 154(b) by 24 days.

(21) Appl. No.: 16/502,319

(22) Filed: Jul. 3, 2019

(65) Prior Publication Data
US 2019/0325119 A1  Oct. 24, 2019

Related U.S. Application Data

(62) Division of application No. 14/633,806, filed on Feb. 27, 2015, now Pat. No. 10,460,090.

(51) Int. Cl.
| | | |
|---|---|---|
| G06Q 20/20 | (2012.01) | |
| G01S 1/04 | (2006.01) | |
| G01S 11/06 | (2006.01) | |
| G06F 21/31 | (2013.01) | |
| G06Q 20/40 | (2012.01) | |
| G06V 40/16 | (2022.01) | |
| G10L 17/00 | (2013.01) | |
| H04L 9/40 | (2022.01) | |
| H04L 29/08 | (2006.01) | |
| H04W 12/06 | (2021.01) | |
| H04W 12/50 | (2021.01) | |
| H04L 67/12 | (2022.01) | |

(52) U.S. Cl.
CPC ......... *G06Q 20/206* (2013.01); *G06F 21/316* (2013.01); *G06Q 20/20* (2013.01); *G06Q 20/208* (2013.01); *G06Q 20/40* (2013.01); *G06Q 20/401* (2013.01); *G06Q 20/40145* (2013.01); *G06Q 20/4016* (2013.01); *G06V 40/172* (2022.01); *G10L 17/00* (2013.01); *H04L 63/08* (2013.01); *H04L 63/0853* (2013.01); *H04L 63/102* (2013.01); *H04W 12/06* (2013.01); *H04W 12/50* (2021.01); *G06F 2221/2111* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 8,695,872 B2 * | 4/2014 | Braunstein | G07F 9/026 235/379 |
| 8,898,758 B2 | 11/2014 | Steeves et al. | |
| 9,485,237 B1 | 11/2016 | Johansson et al. | |

(Continued)

*Primary Examiner* — Talia F Crawley
(74) *Attorney, Agent, or Firm* — Schwegman Lundberg & Woessner, P.A.

(57) ABSTRACT

Data is automatically collected; the data relevant to user attributes. That data is provided as factors for passive authenticating the user for access to a device and/or a resource. In an embodiment, the data is used to establish a profile or a pattern for the user.

13 Claims, 4 Drawing Sheets

(56) References Cited

U.S. PATENT DOCUMENTS

| | | |
|---|---|---|
| 9,509,676 B1 | 11/2016 | Johnson et al. |
| 9,548,979 B1 | 1/2017 | Johnson et al. |
| 9,754,093 B2* | 9/2017 | Kobres ................. G06Q 20/40 |
| 9,800,570 B1* | 10/2017 | Bleisch ............... H04W 12/082 |
| 10,013,983 B1* | 7/2018 | Johnson ............... H04L 63/083 |
| 10,019,561 B1 | 7/2018 | Shelton et al. |
| 10,354,054 B2* | 7/2019 | Kobres ................ H04L 63/102 |
| 10,432,605 B1* | 10/2019 | Lester .................. G06F 21/552 |
| 10,460,090 B2* | 10/2019 | Kobres .............. G06Q 20/4016 |
| 10,515,639 B1* | 12/2019 | Johnson ............... H04L 63/102 |
| 10,803,436 B2* | 10/2020 | Kobres ............ G06Q 20/40145 |
| 2002/0067259 A1 | 6/2002 | Fufidio et al. |
| 2003/0107650 A1* | 6/2003 | Colmenarez ........... G06V 20/52 |
| | | 348/150 |
| 2004/0230488 A1 | 11/2004 | Beenau et al. |
| 2005/0246292 A1 | 11/2005 | Sarcanin |
| 2006/0219780 A1* | 10/2006 | Swartz ...................... G07F 7/02 |
| | | 235/383 |
| 2007/0198410 A1 | 8/2007 | Abgold et al. |
| 2007/0294207 A1* | 12/2007 | Brown ................. G07G 1/0036 |
| 2008/0231448 A1* | 9/2008 | Fowler ............... G08B 13/2417 |
| | | 340/572.1 |
| 2009/0037983 A1 | 2/2009 | Chiruvolu et al. |
| 2009/0076966 A1 | 3/2009 | Bishop et al. |
| 2009/0240571 A1* | 9/2009 | Bonner ................ H04L 67/535 |
| | | 701/519 |
| 2010/0153174 A1* | 6/2010 | Angell ................. G06Q 10/10 |
| | | 705/7.29 |
| 2010/0192209 A1 | 7/2010 | Steeves et al. |
| 2011/0016534 A1 | 1/2011 | Jakobsson et al. |
| 2011/0099602 A1 | 4/2011 | Apparao et al. |
| 2011/0208569 A1* | 8/2011 | Fano ...................... G06N 20/00 |
| | | 705/14.1 |
| 2011/0208613 A1* | 8/2011 | Parham ................. G06Q 30/06 |
| | | 705/26.61 |
| 2011/0314530 A1 | 12/2011 | Donaldson et al. |
| 2012/0137340 A1 | 5/2012 | Jakobsson et al. |
| 2013/0047227 A1 | 2/2013 | Schultz et al. |
| 2013/0067546 A1* | 3/2013 | Thavasi .................. G06F 21/31 |
| | | 726/7 |
| 2013/0067547 A1 | 3/2013 | Thavasi et al. |
| 2013/0311332 A1* | 11/2013 | Favish ............... G06Q 30/0269 |
| | | 705/26.41 |
| 2014/0108195 A1* | 4/2014 | Stawar ............... G06Q 30/0633 |
| | | 705/26.8 |
| 2014/0123307 A1 | 5/2014 | Jung et al. |
| 2014/0125019 A1* | 5/2014 | Hannah .................. B62B 3/1412 |
| | | 280/33.994 |
| 2014/0223522 A1 | 8/2014 | Steeves et al. |
| 2014/0316984 A1* | 10/2014 | Schwartz ......... G06Q 20/40145 |
| | | 705/44 |
| 2014/0331293 A1 | 11/2014 | Toole et al. |
| 2015/0073899 A1* | 3/2015 | Carpenter ............. B62B 3/1424 |
| | | 705/26.8 |
| 2015/0153443 A1* | 6/2015 | Van Taunay .......... G01S 1/0428 |
| | | 702/155 |
| 2015/0205300 A1* | 7/2015 | Caver ................... G05D 1/0278 |
| | | 701/23 |
| 2015/0205957 A1* | 7/2015 | Turgeman ............. G06F 21/554 |
| | | 726/23 |
| 2015/0310444 A1* | 10/2015 | Chen .................. G06Q 20/3226 |
| | | 705/44 |
| 2016/0021117 A1* | 1/2016 | Harmon .................. H04L 63/08 |
| | | 726/1 |
| 2016/0063227 A1* | 3/2016 | Kobres ................... G10L 17/00 |
| | | 726/3 |
| 2016/0063471 A1* | 3/2016 | Kobres ................. G06Q 20/40 |
| | | 705/18 |
| 2016/0063492 A1* | 3/2016 | Kobres ................ H04L 63/102 |
| | | 705/16 |
| 2016/0063503 A1* | 3/2016 | Kobres ................. G06Q 20/40 |
| | | 705/18 |
| 2016/0094528 A1 | 3/2016 | Gordon |
| 2016/0110528 A1* | 4/2016 | Gupta .................. H04L 63/105 |
| | | 726/19 |
| 2016/0162683 A1* | 6/2016 | Gibson .................. G06F 21/32 |
| | | 726/17 |
| 2016/0182502 A1* | 6/2016 | Smith ................. H04L 63/0884 |
| | | 726/7 |
| 2016/0203499 A1* | 7/2016 | Yamashita ............. G06V 20/52 |
| | | 705/7.29 |
| 2016/0359838 A1* | 12/2016 | Dasgupta ................ G06F 21/45 |
| 2018/0307815 A1* | 10/2018 | Samadani ............... G06F 21/32 |
| 2018/0373857 A1 | 12/2018 | Larsen |
| 2019/0156506 A1* | 5/2019 | Fisher ........................ G06T 7/70 |
| 2020/0218793 A1* | 7/2020 | Storm ..................... G06V 40/25 |
| 2020/0275271 A1* | 8/2020 | Saripalle ............. G06V 10/809 |

* cited by examiner

METHODS AND SYSTEM FOR PASSIVE AUTHENTICATION THROUGH USER ATTRIBUTES

RELATED APPLICATIONS

The present application is a divisional of and claims priority to, application Ser. No. 14/633,806 entitled: "Methods and System for Passive Authentication through User Attributes," filed on Feb. 27, 2015 and now issued as U.S. Pat. No. 10,460,090, which is a non-provisional filing of Provisional Patent Application Ser. No. 62/043,025 entitled: "Passive Authentication and Authentication Confidence Calculator," filed on Aug. 28, 2014, the disclosures of which are incorporated in their entireties herein and below.

BACKGROUND

Electronic authentication is commonplace in today's highly-connected society, especially in view of the fact that more and more individuals are conducting financial and personal transaction electronically.

Authentication can come in a variety of forms, such as single-factor authentication and multifactor authentication. Authentication can be done with different degrees of perceived strength. For example, biometric authentication is typically believed to be a stronger form of authentication than an identifier and password combination.

Some authentication requires a user to possess something (such as a token or a magnetic card) and to know something (such as a password or key value). Generally, authentication requires some action on the part of the individual being authenticated, such as having finger scanned, entering a card and Personal Identification Number (PIN), providing a token or certificate with a key, and the like.

Most authentication techniques are binary in nature, which means the authentication technique authenticates an entity or fails to authenticate the entity. Authentication is typically associated with individuals being authenticated but in fact, hardware resources and software resources are also subject to authentication in computer systems.

However, if authentication is wanted not for necessarily performing a secure transaction, accessing a secure system, or verifying a secure asset but, rather authentication is wanted for deciding whether there is a measurable degree of confidence that someone can be identified without any affirmative knowledge or action on the part of that someone, then very little exists in the industry for this type of authentication. But, such a technique can provide a variety of beneficial opportunities for enterprises for purposes of: marketing, customer service, Customer Relationship Management (CRM), security within an enterprise, security of an individual's personal device, security within law and government agencies, and the like.

Therefore, there is a need for improved authentication mechanisms.

SUMMARY

In various embodiments, methods and a system for passive authentication through user attributes are presented.

According to an embodiment, a method for passive authentication through user attributes is presented. Specifically, data relevant to attributes of a user is collected. Next, the user is passively authenticated based on the collected data.

DETAILED DESCRIPTION

Figure 1:
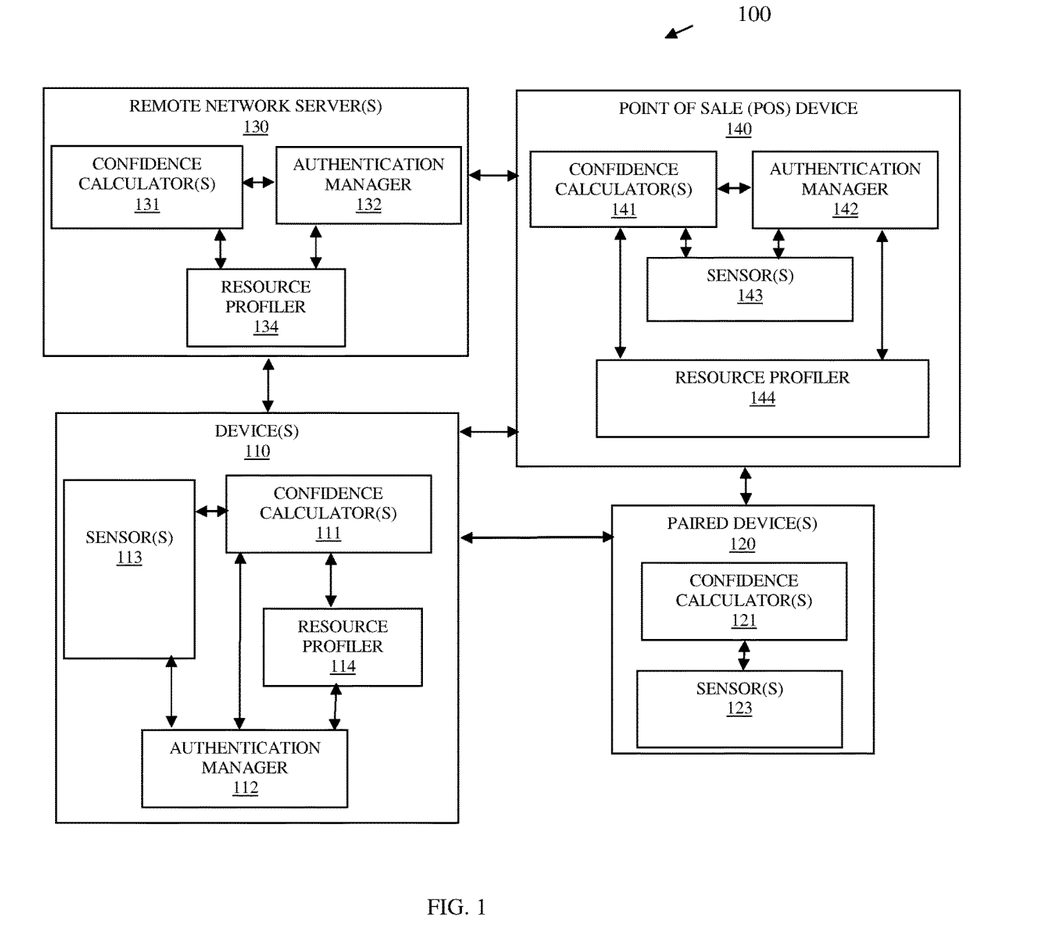
FIG. 1 is a diagram illustrating a system for passive authentication through user attributes, according to an example embodiment.

FIG. 1 is a diagram illustrating a system 100 for passive authentication through user attributes, according to an example embodiment.

As used herein "user attributes" are measurable: physical habits, physical actions, and/or physical characteristics of a user. The user attributes are captured through sensors integrated into devices and/or captured through resource profiling software modules that process on devices that the user knowingly or unknowingly operates.

A "resource" can include: a hardware asset of a device (e.g., processor, peripheral, communication port, etc.), a software asset of a device (e.g., an application program, an automated electronic service, an electronic system, a file, etc.), and an apparatus to which a device is attached (e.g., a shopping basket, a shopping cart, a motorized cart, etc.).

As used herein term "confidence" and the phrase "confidence value" may be used interchangeably and synonymously. The term and phrase refer to a computed scalar value provided through the various mechanisms and inputs to those mechanisms discussed herein and below. The scalar value is relevant to determining whether a user and/or a device associated with that user is to be authenticated. That is, the scalar value when compared to a predetermined value may provide authentication of a user and/or of a device.

The authentication performed is "passive," which means that the user does not have to affirmatively provide (through a manual input mechanism) any credential to achieve authentication; rather, the confidence associated with ongoing and continuous authentication of the user and/or device occurs through regularly computing, in an unobtrusive and transparent manner from the perspective of the user, the authentication confidence (scalar value), which is then compared with a predetermined value to determine whether authentication was achievable or not achievable.

It is noted that based on the comparison between any computed confidence and any predetermined value; authentication does not have to be a binary exercise. That is, a user may be granted different levels of access (to resources of a device) based on a computed difference between the confidence value (at any given point in time) and a predetermined value. For example, when the different between the computed confidence and a predetermined value is within a predefined range, then the user is granted access to limited resources and not all available resources on a device. This is but one example; the point is that confidence with respect to user/device authentication can result in: a failed authentication having no access to any resources, a successful authentication having access to all resources, or a limited authentication having varying levels of access to some resources.

A "confidence calculator" is one or more software modules implemented as executable instructions within a memory of a device and/or on a non-transitory computer-readable storage medium of the device. The executable instructions execute on one or more processors of the device.

The confidence calculator can be executed in multiple different processing environments and on multiple different devices as a particular "instance" of the confidence calculator. Multiple instances of the confidence calculator may cooperate with one another to produce a single confidence value. In some cases, multiple instances of the confidence calculator may be chained together, such that output from one instance becomes one input value to a next instance in the chain of confidence calculators.

As used herein the "confidence calculator" was described and incorporated by reference herein in its entirety from Provisional Patent Application Ser. No. 62/043,025 entitled: "Passive Authentication and Authentication Confidence Calculator," filed on Aug. 28, 2014.

The system 100 includes a variety of modules that can be optionally configured in a variety of arrangements. For example, the device 110 may include just sensors 113 and an authentication manager 112, which communicates with other external confidence calculators (121, 131, and/or 141) and other external authentication managers (122 and/or 142). So, although the system 100 is described as each device (110, 120, 130, and 140) as having a variety of components, it is to be understood that other arrangements are foreseeable without departing from the beneficial teachings of continuous automated authentication presented herein.

The system 100 includes a device 110 having a confidence calculator 111, an authentication manager 112, one or more sensors 113 (hereinafter sensors 113), and, optionally, a resource profiler 114. Optionally, the system 100 includes a paired/interfaced device 120 having a confidence calculator 121 and sensors 123. The system 100 may also include a remote network server 130 having a confidence calculator 131, an authentication manager 132, and a resource profiler 134. Still further the system 100 includes a POS terminal/device 140 having a confidence calculator 141, an authentication manager 142, sensors 143, and a resource profiler 144.

It is also noted that in some embodiments, the processing associated with the authentication managers 112, 132, and 142 may subsumed with the processing associated with the resource profilers 114, 134, and 144.

In an embodiment, the device 110 is attachable to another apparatus, such as but not limited to: a shopping basket, a shopping cart, and a motorized shopping cart.

In an embodiment, the device 110 is mobile phone.

In an embodiment, the device 110 is a tablet.

In an embodiment, the device 110 is a laptop.

In an embodiment, the device 110 is an appliance.

In an embodiment, the device 110 is a desktop computer.

In an embodiment, the device 110 is a wearable processing device.

In an embodiment, the device 110 is a vehicle.

The device 110 includes one or more processors, memory, and non-transitory computer-readable storage media. The device 110 is either: 1) operated by a user or 2) attached to an apparatus that a user is operating. The device 110 includes a variety of software, hardware, and data assets (resources), and, perhaps, integrated peripheral devices.

The confidence calculator 111 is implemented as one or more software modules as executable instructions that are programmed in the firmware, dedicated secure processor, general purpose memory and/or non-transitory computer-readable storage media of the device 110. The device's processors are configured to execute the confidence calculator 111. In an embodiment, the confidence calculator 111 is initiated and loaded for processing within the device 110 when the device 110 is booted or powered on.

The confidence calculator 111 is configured to execute in a transparent and unobtrusive manner so that the user can continue to operate the device without an indication of the processing being performed by the confidence calculator 111.

The frequency with which the confidence calculator 111 performs iterations to gather input data and produce a confidence value is configurable. However, when an event is detected requiring authentication of the user, such as when: the user unlocks a screen rendered on a display of the device 110, powers the device 110 on, attempts to access a specific resource requiring additional authentication, attempts to checkout at the POS device 140 for a transaction, and the like, the confidence calculator 111 provides access to continuously computed single scalar confidence values over time using input data provided by the sensors 113, external sensors 123 and/or 143, and/or resource profilers 114, 134, and/or 144.

The processing associated with the confidence calculators 111, 121, 131, and 141 were discussed in the provisional filing that was incorporated by reference herein in its entirety.

The input streams of data that the confidence calculator 111 processes are provided by the sensors 113.

In an embodiment, a sensor 113 is a Global Positioning Satellite (GPS) receiver.

In an embodiment, a sensor 113 is an accelerometer.

In an embodiment, a sensor 113 is a gyroscope.

In an embodiment, a sensor 113 is a thermometer.

In an embodiment, a sensor 113 is a barometer.

In an embodiment, a sensor 113 is a scanner.

In an embodiment, a sensor 113 is a camera (front and/or read facing camera).

In an embodiment, a sensor 113 is a microphone.

In an embodiment, a sensor 113 is a fingerprint scanner.

In an embodiment, a sensor 113 is a touch screen.

In an embodiment, a sensor 113 is a smell sensor.

In an embodiment, a sensor 113 is a motion sensor.

In an embodiment, a sensor 113 is an infrared sensor.

In an embodiment, a sensor 113 is a Human Input Device (HID).

The output of the confidence calculator 111 is a scalar confidence value that can be used alone or in combination with other scalar confidence values to make an automated passive authentication determination for an operator of the device 110 at a given point in time. This is done through the authentication manager 112. In an embodiment, the automated passive authentication determination is outsourced by the authentication manager 112 to either the authentication manager 132 or the authentication manager 142.

It is to be noted that the phrase "operator of the device 110" means that a user either knowingly or unknowingly operates the device. By "knowingly" it is meant that the user actively operates the device (such as a user's mobile phone). By "unknowingly" it is meant that the user interacts with an apparatus to which the device 110 is integrated or interfaced to, such as a shopping basket, a shopping cart, and/or a motorized shopping cart.

It is noted that the authentication manager 112 may send the request that triggers the confidence calculator 111 to provide the currently calculated confidence value as well.

The authentication manager 112 is preconfigured with authentication values, ranges of values, thresholds, and/or policy conditions that when compared against the single confidence value makes a decision as to whether to authenticate the user for access to the device 110 or as to whether to authenticate the user for access to a specific resource or specific set of resources accessible from the device 110.

The device 110 also includes a resource profiler 114. Memory and/or non-transitory computer-readable storage media is programmed with executable instructions representing the resource profiler 114 as one or more software modules that execute on one or more processors of the device 110.

The resource profiler 114 collects data relevant to user activity with respect to a resource, such as a software resource, a hardware resource, and/or an apparatus to which the device 110 is interfaced to and/or attached to. In an embodiment, the resource profiler 114 also collects data from the sensors 113, 123, and/or 143 (from paired device 120).

The data collected can include a variety of information, such as, but not limited to: time of day, day of week, device geographical position, resource identifier that identifies a resource for which that data is gathered for, resource settings during time which resource data is collected, resource orientations during time which resource data is collected, resource paths and angle of movement during time which resource data is collected, a smell value associated with an operator (user) of the device 110 and/or resource.

In an embodiment, the resource profilers 114, 134, and/or 144 collect at least some of the data from an Operating System (OS) of the devices 110, 130 (server), 140 (POS device).

In an embodiment, the resource profilers 114, 134, and/or 144 process as monitors and/or tracking applications of resources that are hardware and/or software resources for purposes of collecting at least some of the data.

During operation, each of the resource profilers 114, 134, and 144 collect data while a user is knowingly or unknowingly operating the device 110.

In an embodiment, the resource profilers 114, 134, and/or 144 collect the data for an interval or time as a grouping of data over that interval of time. The interval of time can be automatically determined by the resource profilers 114, 134, and/or 144 based on predefined starting and ending events. For example, a starting event can be defined as detection that the user is initiating an interaction with a resource to which the device 110, 130 (server), and/or 140 (POS device) is associated with and an ending event can be defined as detection that the device 110 is in wireless communication with the server 130 and/or POS device 140. It is noted that a variety of predefined starting and ending events can be predefined for automatically triggering the resource profilers 114, 134, and/or 144 to begin collect data and end collection of data.

In an embodiment, the resource profiler 114 processes on a device 110 that is attached to an apparatus that is a shopping basket, a shopping cart, or motorized shopping cart. The resource profiler 114 begins collection of data when detection (predefined starting event) is made that a consumer has acquired physical possession of the apparatus (through sensors 113). The data collected (via sensors 113 and OS acquired information) is relevant to one or more of: day of week, calendar day, time of day, a path taken by the apparatus, pressure used by the consumer in handling the apparatus (grasping, carrying, manipulating electronic controls (for motorized shopping cart), and/or pushing), time spent and location of time spent when the apparatus is immobile, angle and orientation of the apparatus when the apparatus changes direction, and rate of movement detected when the apparatus is moving. The resource profiler 114 collects the data as a grouping of data until the resource profiler 114 detects a connection between the device 110 and a POS device 140. The resource profiler 114 then transmits a device identifier for the device 110 along with the grouping of data to the resource profiler 144 of the POS device 140. The connection between the device 110 and the POS device 140 is an indication that the consumer is at a checkout terminal (SST or cashier-assisted terminal), which is the POS device 140. It may also be that the resource profiler 144 makes a request for the grouping of data from the resource profiler 114 at the POS device 140. The grouping of data is then provided to confidence calculator 141 and/or 131 as factors to authenticate the grouping of data as a specific customer identity for a specific customer of the retailer (this assumes that historical data associated with the customer exists with respect to the customer's attributes with respect to the apparatus and the retailer exists for authenticating the customer. The confidence calculator 141 and/or 131 supplies a confidence value to authentication manager 132 and/or 142. The authentication manager 132 and/or 142 compares the confidence value to a predefined value or predefined range of values to authenticate the customer to the customer identity. A profile on record for the customer may then permit the customer to perform automatic payment via a payment method on record. When no historical data is on file for the customer, then during checkout for the transaction, the customer provides some form of identification (loyalty card, credit card, etc.) and the grouping of data is associated with the customer-supplied identifying data and used as historical data for the customer. Each time the customer visits the retailer the grouping of data can be updated and refined. In this manner, customer attributes associated with the manner and habits of the customer within a retail establishment can be used as a form of automatic passive authentication during a checkout process at a POS device 140. It is also noted that the grouping of data can also be historically recorded for marketing purposes to identify where within the retailer the customer is frequenting during visits. Groupings for different classes of customers can be mined to create customer segments for promotional campaigns and the like.

In another embodiment, the resource profiler 114 interacts with an OS of the device 110, monitors and processing execution environment of the device 110, and/or monitors specific software resources or communication ports of the device 110. The resource profiler 114 is configured to capture data relevant to usage of the software resources to capture a device user's profile with respect to those software resources. For example, suppose a user of the device 110 begins a day by accessing an email software resource on the device 110, followed by checking news sites on a web browser software resource on the device 110, followed by checking text messages for a messaging software resource on the device 110, etc. The manner in which these software resources are accessed (time spent, operations accessed, etc.), the order in which these software resources are accessed, and the time of day and day of week of access can all be used to establish factors and a pattern for the user of the device 110 for purposes of passively authenticating the user for access to the device 110. This scenario can be more complicated as well, such as what actions does the user do when a call is received on the device 110 while engaged in accessing a particular software resource, such as texting or email (will the user ignore the call or immediately answer the call, etc.). The resource profiler 114 may maintain a pattern or profile for the user with respect to certain software resources and/or groupings of the software resources. The pattern can include: sequence of software resource access, time spent with each software resource, time of day for access, day of week for access, actions taken when another software resource sends a notification (such as an email, a text, a call, etc.), and the like. So, when a user, at any given point in time, requires authentication to either the device 110, a resource of the device 110, and/or interaction with a resource of the POS device 140 (for a transaction, etc.), a current set of recently gathered data for the device 110 can be passed as factors for the confidence calculators 111, 121, 131, and/or 141 to provide a confidence value that is passed to authentication managers 112, 132, and/or 142 for authentication. In some embodiments, the data collected from monitoring the software resources may be viewed as a user's attention span when accessing one or more of the software resources. Again, the data collected are considered user attributes with respect to accessing the software resources.

In still another scenario, the resource profiler 114 may use a smell sensor 113 to continuously and regularly and continuously gather smell values (translated to digital representations). Each person, at any given point in time and on a given day, can exhibit a unique smell or odor that can be dependent on a variety of factors or user attributes, such as, but not limited to: deodorant, cologne, perfume, lotion, ointments, hair care products, mouth wash, foods eaten, medicine taken, physical activity recently performed (exercise, shower, wake from sleep, return from work, etc.), current location (bar, bowling alley, ethnic restaurant, etc.), previous location visited, and the like. The smells are captured as smell values from the smell sensor 113 and provided to the resource profiler 114 and/or authentication manager 112. The smell values when combined with other resource profiler 114 data (time of day, day of week, geographical position of the device 110, etc.) are passed to confidence calculators 111, 131, and/or 141 and at any given point in time a confidence value is supplied to the authentication calculators 112, 132, and/142 for purposes of authenticating the user for access to the device 110, a resource of the device 110, and/or access to the server 130 (and/or a resource of the server 130), and/or access to the POS device 140 (and/or a resource of the POS device 140). The resource profiler 114 may communicate with other instances of the resource profiler, such as 134 and/or 143 to maintain a historical smell pattern based on the other factors (time of day, day of week, geographical position of the device 110, etc.).

In an embodiment, the resource profiler 114 collects data from a pedometer sensor 113 integrated into the device 110 and/or paired as sensor 121 of a paired device 120 to the device 110. This permits the resource profiler 114 to collect a number of steps, distance traveled, and step size during any given interval of time. This data can be used to establish step size and walking user attributes for a user of the device 110 as factors for the confidence calculators 111, 121, 131, and/or 141. The confidence calculators 111, 121, 131, and/or 141 pass a single confidence value to the authentication managers 112, 132, and/142 to passively authenticate the user of the device 110 for access to the device 110, a resource of the server 130, and/or a resource of the POS device 140 at any given point in time. In some embodiments, the data collected can be paired with a known activity of the user, such as exercise, shopping, work, etc. and used to create different user attributes for authentication depending upon the activity that the user was performing at the time the data was collected from the pedometer sensor 113 and/or 123.

In an embodiment, the processing of the confidence calculator 111 requests and uses confidence values supplied by one or more of: a confidence calculator 121 of a paired/connected device 120, a confidence calculator 131 of a remote network server 130, and/or a confidence calculator 142 of a POS device 140 that the device 110 is interacting with to complete a transaction.

The paired device 100 may include its own confidence calculator 121 and its own sensors 123. The paired device 100 may interact and be paired with the device 110 and/or the POS device 140. The confidence calculator 121 receives input from its sensors 123 and produces a single confidence scalar value at a given point in time. This confidence value can be supplied to the authentication manager 112 of the device 110 and/or to the authentication manager 142 of the POS device 140.

In an embodiment, the paired device 100 is a pair of processor-enabled glasses.

In an embodiment, the paired device 100 is a processor-enabled watch.

In an embodiment, the paired device 100 is a processor-enabled health-related band or pendant.

In an embodiment, the paired device 100 is a pedometer.

The remote network server 130 may be used to collect sensor data from the device 110, the paired device 120, and/or POS device 140 to produce a confidence value and make an automated passive authentication determination through the authentication manager 132, which is communicated to the authentication manager 112 and/or the authentication manager 143.

In an embodiment, the confidence calculator 131 collects component confidence values, at any point in time, from the confidence calculators 111, 121, and/or 142, perhaps weights these confidence values and produces a single confidence value that is fed to the authentication manager 132 for an automated passive authentication determination at a particular point in time.

The POS device 140 may include its own sensors 143 to capture aspects associated with the operator of the device 110 and may include its own confidence calculator 141 and authentication manager 142. The confidence calculator may be interfaced with the other confidence calculators 111, 121, and/or 131 and the authentication manager 142 may be interfaced with one or more of the other authentication managers 112 and/or 132.

In an embodiment, the POS device 140 is a Self-Service Terminal (SST).

In an embodiment, the POS device 140 is a cashier-assisted checkout terminal.

In an embodiment, the POS device 140 is an Automated Teller Machine (ATM).

In an embodiment, the POS device 140 is a kiosk.

A variety of other scenarios may be processed as well by the system 100 to perform continuous automated passive authentication of a user and/or the user's device 110. This provides convenience to the user and improves transaction throughput and security at the POS terminal 140 and assist in the prevention of device 110 thefts and/or fraud at the POS terminal 140.

Some of embodiments of the FIG. 1 and other embodiments are now discussed with reference to the FIGS. 2-4.

Figure 2:
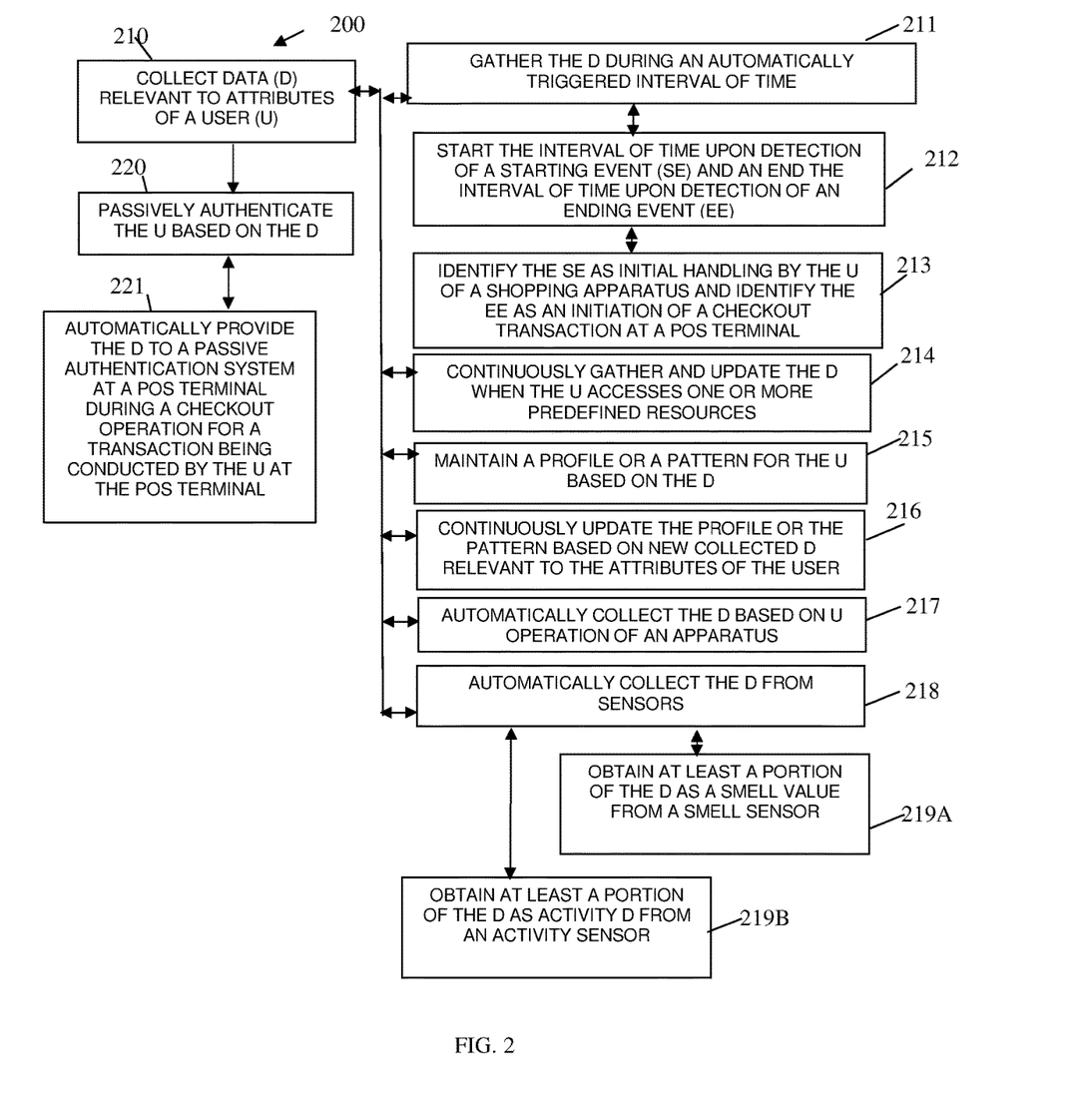
FIG. 2 is a diagram of a method for passive authentication through user attributes, according to an example embodiment.

FIG. 2 is a diagram of a method 200 for passive authentication through user attributes, according to an example embodiment. The software module(s) that implements the method 200 is referred to as a "user-attribute authenticator." The user-attribute authenticator is implemented as executable instructions programmed and residing within secure memory and/or a non-transitory computer-readable (processor-readable) storage medium and executed by one or more processors of a device. The processor(s) of the device that executes the user-attribute authenticator are specifically configured and programmed to process the user-attribute authenticator. The user-attribute authenticator has access to one or more network connections during its processing. The network connections can be wired, wireless, or a combination of wired and wireless.

In an embodiment, the device that executes the user-attribute authenticator is a POS terminal.

In an embodiment, the device that executes user-attribute authenticator is a Self-Service Terminal (SST).

In an embodiment, the device that executes the user-attribute authenticator is a kiosk.

In an embodiment, the device that executes the user-attribute authenticator is an Automated Teller Machine (ATM).

In an embodiment, the device that executes the user-attribute authenticator is a cashier-assisted terminal.

In an embodiment, the device that executes the user-attribute authenticator is a mobile phone.

In an embodiment, the device that executes the user-attribute authenticator is a tablet.

In an embodiment, the device that executes the user-attribute authenticator is wearable processing device.

In an embodiment, the device that executes the user-attribute authenticator is a vehicle.

In an embodiment, the device that executes the user-attribute authenticator is a laptop.

In an embodiment, the device that executes the user-attribute authenticator is a desktop computer.

In an embodiment, the device that executes the user-attribute authenticator is an appliance.

In an embodiment, the device that executes the continuous authenticator attached to or integrated into an apparatus. In an embodiment, the apparatus is a shopping basket. In an embodiment, the apparatus is a shopping cart. In an embodiment, the apparatus is a motorized shopping cart.

In an embodiment, the user-attribute authenticator is the resource profiler 114 of the FIG. 1.

In an embodiment, the user-attribute authenticator is the resource profiler 134 of the FIG. 1.

In an embodiment, the user-attribute authenticator is the resource profiler 144 of the FIG. 1.

At 210, the user-attribute authenticator collects data relevant to attributes of a user. Some example data and user attributes were presented above with respect to the discussion of the system 100 of the FIG. 1. Moreover, the user attributes may be, in some embodiments, attributes that the user is completely unaware of, such as a manner in which a user shops, a manner in which a user accesses resources, a manner in which a user walks or performs activity, a smell uniquely associated with the user, and the like.

According to an embodiment, at 211, the user-attribute authenticator gathers the data during an automatically triggered interval of time.

In an embodiment of 211 and at 212, the user-attribute authenticator starts the interval of time upon detection of a starting event and the user-attribute authenticator ends the interval of time upon detection of an ending event.

In an embodiment of 212 and at 213, the user-attribute authenticator identifies the starting event as initial handling by the user of a shopping apparatus and the user-attribute authenticator identifies the ending event as an initiation of a checkout transaction at a POS terminal.

In an embodiment, at 214, the user-attribute authenticator continuously gathers and updates the data when the user accesses one or more predefined resources.

In an embodiment, at 215, the user-attribute authenticator maintains a profile or a pattern for the user based on the data.

In an embodiment, at 216, the user-attribute authenticator continuously updates the profile or the pattern based on newly collected data relevant to the attributes of the user.

In an embodiment, at 217, the user-attribute authenticator automatically collects the data based on user operation of an apparatus.

In an embodiment, at 218, the user-attribute authenticator automatically collects the data from sensors, which are interfaced to a device that executes the user-attribute authenticator.

In an embodiment of 218 and at 219A, the user-attribute authenticator obtains at least a portion of the data as a smell value obtained from a smell sensor interfaced to the device.

In an embodiment of 218 and at 219B, the user-attribute authenticator obtains at least a portion of the data as activity data from an activity sensor (health, pedometer, etc.) interfaced to the device.

At 220, the user-attribute authenticator passively authenticates the user based on the data.

According to an embodiment, at 221, the user-attribute authenticator automatically provides the data to a passive authentication system at a POS terminal during a checkout operation for a transaction being conducted by the user at the POS terminal. In an embodiment, the system includes the components of the POS terminal 140 of the FIG. 1.

Figure 3:
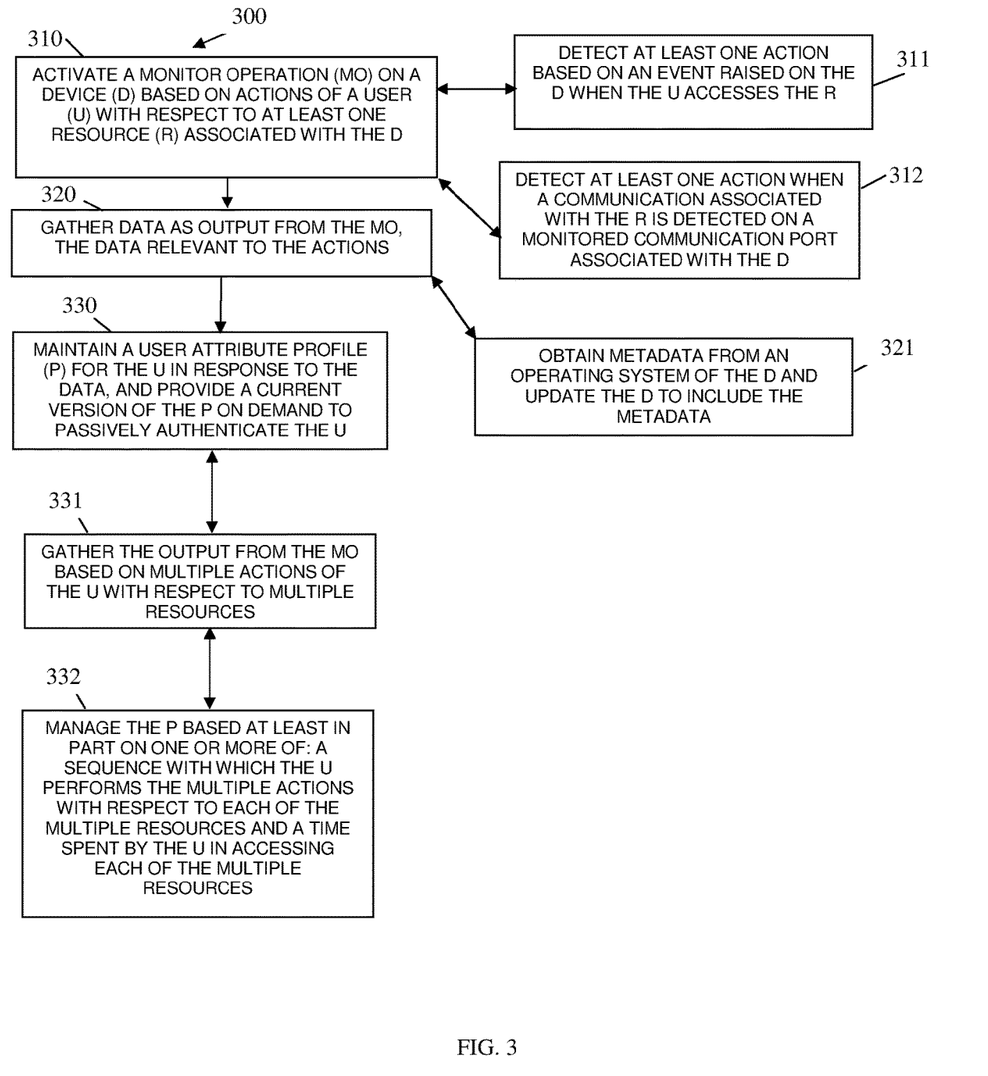
FIG. 3 is a diagram of another method for passive authentication through user attributes, according to an example embodiment.

FIG. 3 is a diagram of another method 300 for passive authentication through user attributes, according to an example embodiment. The software module(s) that implements the method 300 is referred to as a "resource profiler." The resource profiler is implemented as executable instructions programmed and residing within secure memory and/or a non-transitory computer-readable (processor-readable) storage medium and executed by one or more processors of a device. The processors that execute the resource profiler are specifically configured and programmed to process the resource profiler. The resource profiler has access to one or more network connections during its processing. The network connections can be wired, wireless, or a combination of wired and wireless.

In an embodiment, the device that executes the resource profiler is different from a second device that the resource profiler is providing authentication for. In an embodiment, the device is within a local networked environment of the second device. In an embodiment, the device is remotely located over a Wide-Area Network (WAN) from the device.

In an embodiment, the device that executes the resource profiler is a POS terminal.

In an embodiment, the device that executes resource profiler is a Self-Service Terminal (SST).

In an embodiment, the device that executes the resource profiler is a kiosk.

In an embodiment, the device that executes the resource profiler is an Automated Teller Machine (ATM).

In an embodiment, the device that executes the resource profiler is a cashier-assisted terminal.

In an embodiment, the device that executes the resource profiler is a mobile phone.

In an embodiment, the device that executes the resource profiler is a tablet.

In an embodiment, the device that executes the resource profiler is wearable processing device.

In an embodiment, the device that executes the resource profiler is a vehicle.

In an embodiment, the device that executes the resource profiler is a laptop.

In an embodiment, the device that executes the resource profiler is a desktop computer.

In an embodiment, the device that executes the resource profiler is an appliance.

In an embodiment, the resource profiler is the resource profiler 114 of the FIG. 1.

In an embodiment, the resource profiler is the resource profiler 134 of the FIG. 1.

In an embodiment, the resource profiler is the resource profiler 144 of the FIG. 1.

In an embodiment, the resource profiler is a combination of one or more of: the resource profiler 114, the resource profiler 134, the resource profiler 144, the authentication manager 112, the authentication manager 132, and the authentication manager 142.

In an embodiment, the resource profiler is the method 200 of the FIG. 2.

At 310, the resource profiler activates a monitor operation on a device based on actions of a user with respect to at least one resource associated with the device.

According to an embodiment, at 311, the resource profiler detects at least one action based on an event raised on the device when the user accesses the resource.

In an embodiment, at 312, the resource profiler detects at least one action when a communication associated with the resource is detected on a monitored communication port associated with the device.

At 320, the resource profiler gathers data as output from the monitor operation. The data is relevant to the actions taken by the user with respect to the resource(s).

According to an embodiment, at 321, the resource profiler obtains metadata from an operating system of the device and updates the data to include the metadata. In an embodiment, the metadata includes: time of day, day of week, calendar day, resource identifier for the resource, device identifier for the device, and the like.

At 330, the resource profiler maintains a user attribute profile for the user in response to the data, and the resource profiler provides a current version of the profile on demand to passively authenticate the user.

According to an embodiment, at 331, the resource profiler gathers the output from the monitor operation based on multiple actions of the user with respect to multiple resources.

In an embodiment of 331 and at 332, the resource profiler manages the profile based at least in part on one or more of: a sequence with which the user performs multiple actions with respect to each of the multiple resources and a time spent by the user in accessing each of the multiple resources.

Figure 4:
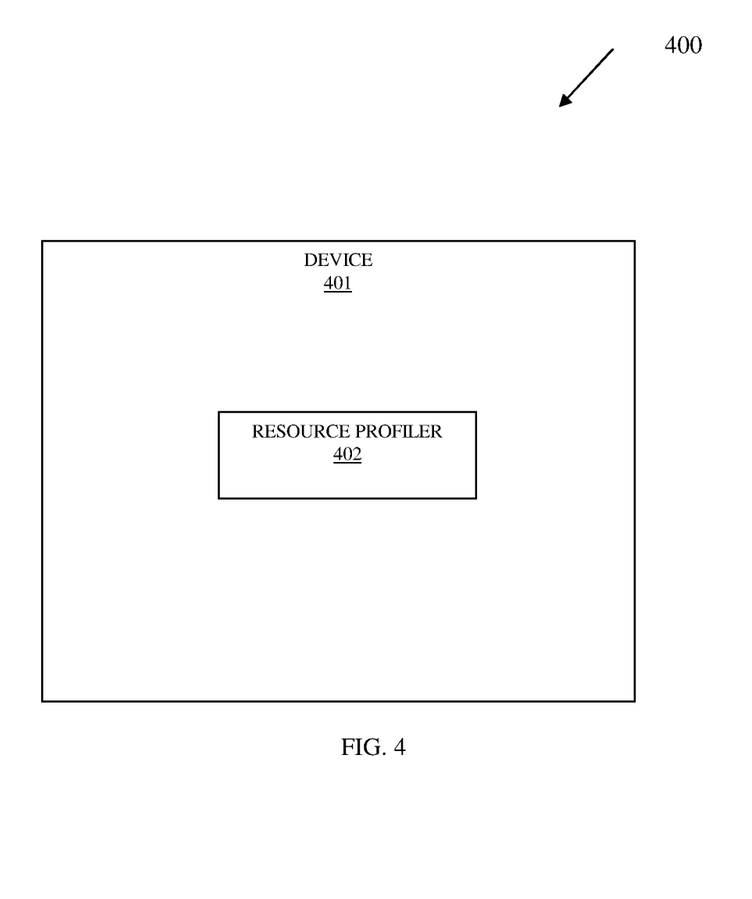
FIG. 4 is a diagram of a passive authentication system, according to an example embodiment.

FIG. 4 is a diagram of a passive authentication system 400, according to an example embodiment. The passive authentication system 400 includes a variety of hardware components and software components. The software components of the passive authentication system 400 are programmed and reside within secure memory and/or a non-transitory computer-readable medium and execute on one or more processors of the passive authentication system 400. The passive authentication system 400 communicates over one or more networks, which can be wired, wireless, or a combination of wired and wireless.

In an embodiment, the passive authentication system 400 implements, inter alia, the embodiments discussed above with reference to the system 100 of the FIG. 1.

In an embodiment, the passive authentication system 400 implements, inter alia, the method 200 of the FIG. 2.

In an embodiment, the passive authentication system 400 implements, inter alia, the method 300 of the FIG. 3.

In an embodiment, the passive authentication system 400 implements all and/or various combinations of the embodiments of the system 100, the method 200, and the method 300.

The passive authentication system 400 includes a device 401 and a resource profiler 402.

In an embodiment, the device 401 is one of: a mobile phone, a wearable processing device, a tablet, a laptop, a computer desktop, a POS terminal, a SST, an ATM, an appliance, a kiosk, an attachable device adapted to be attached to an apparatus, and a vehicle.

The resource profiler 402 is configured to: execute on the device 401, gather data relevant to a manner in which a user operates a resource, continuously provide the data to passively authenticate the user, and maintain a user-attribute profile for the user based on the data.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    detecting, by a device attached to an apparatus via a sensor, a user taking possession of the apparatus, wherein the apparatus is a shopping cart, a motorized shopping cart, or a shopping basket, wherein detecting further includes initiating collection of data from the device based on the detecting of the user taking possession of the apparatus, wherein initiating further includes at least collecting pressure data relevant to a pressure used by the user while handling the apparatus;
    activating a monitor operation on the device based on actions of a user with respect to at least one resource associated with the device;

gathering the data as output from the monitor operation, and wherein the data is relevant to the actions, and wherein the data includes the pressure data;

maintaining a user attribute profile for the user based on the data and providing a current version of the user attribute profile on demand; and passively authenticating the user based on the user attribute profile by computing a confidence value from the user attribute profile to one of a plurality of different levels of access for access of the user to the device, the at least one resource, or other resources of the device, wherein the confidence value is adaptively updated based on machine learning analysis of the gathered data to enhance accuracy of the passive authentication over time.

2. The method of claim 1, wherein activating further includes detecting at least one action based on an event raised on the device when the user accesses the resource.

3. The method of claim 1, wherein activating receiving further includes detecting at least one action when a communication associated with the resource is detected on a monitored communication port associated with the device.

4. The method of claim 1, wherein gathering further includes obtaining metadata from an operating system of the device and updating the data to include the metadata.

5. The method of claim 1, wherein maintaining further includes gathering the output from the monitor operation based on multiple actions of the user with respect to multiple resources.

6. The method of claim 5, wherein maintaining further includes managing the user attribute profile based at least in part on one or more of: a sequence with which the user performs the multiple actions with respect to each of the multiple resources and a time spent by the user in accessing each of the multiple resources.

7. A system, comprising:
a device attached to an apparatus via a sensor;
a resource profiler configured to: i) execute on the device, ii) detect a user taking possession of the apparatus, wherein the apparatus is a shopping cart, a motorized shopping cart, or a shopping basket, wherein the device detects the user taking possession of the apparatus and initiates collection of data from the device, wherein initiating further includes at least collecting pressure data relevant to a pressure used by the user while handling the apparatus iii) gather the data relevant to a manner in which a user operates a resource through user interaction with the apparatus, and iv) continuously provide the data and the pressure data to passively authenticate the user by maintaining a user attribute profile for the user based on the data and continuously computing a confidence value from the user attribute profile to one of a plurality of different levels of access for access of the user to the device, the resource, or other resources of the device, wherein the confidence value is adaptively updated based on machine learning analysis of the gathered data to enhance accuracy of the passive authentication over time.

8. The system of claim 7, wherein the device is one of: a mobile phone, a wearable processing device, a tablet, a laptop, a computer desktop, a Point-Of-Sale (POS) terminal, a Self-Service Terminal (SST), an Automated Teller Machine (ATM), an appliance, an attachable device attached to the apparatus operated by the user, and a vehicle.

9. The method of claim 1 further comprising:
maintaining a pattern of user interactions with the at least one resource.

10. The method of claim 9, wherein maintaining the pattern further includes associating the pattern with an attention span when accessing and interacting with the at least one resource.

11. The method of claim 10, wherein associating further includes storing the pattern and associated attention span in the user attribute profile.

12. The method of claim 1 further comprising:
using a smell sensor associated with the device to capture smells associated with the user;
translating the smells into digital representations of smell values; and
updating the user attribute profile with the smell values.

13. The method of claim 11 further comprising:
using a pedometer sensor associated with the device to capture user steps, a distance traveled, and a step size; and
updating the user attribute profile with the user steps, the distance traveled, and the step size.

* * * * *